United States Patent [19]
Fassbender

[11] Patent Number: 5,195,556
[45] Date of Patent: Mar. 23, 1993

[54] PRESSURE RELIEF VALVE

[75] Inventor: Rolf Fassbender, Mutlangen, Fed. Rep. of Germany

[73] Assignee: ZF Friedrichshafen, AG, Friedrichshafen, Fed. Rep. of Germany

[21] Appl. No.: 894,590

[22] Filed: Jun. 5, 1992

[30] Foreign Application Priority Data

Jun. 8, 1991 [DE] Fed. Rep. of Germany ....... 4118932

[51] Int. Cl.⁵ ............................................. G05D 16/04
[52] U.S. Cl. .................................... 137/491; 137/492.5
[58] Field of Search .............. 137/491, 489, 492, 492.5

[56] References Cited
FOREIGN PATENT DOCUMENTS 2827128 1/1980 Fed. Rep. of Germany ...... 137/491
2827129 1/1980 Fed. Rep. of Germany ...... 137/491

Primary Examiner—Alan Cohan
Attorney, Agent, or Firm—Albert M. Zalkind

[57] ABSTRACT

A pressure relief valve (1) has a relief piston (5) for a large stream of oil and a precontrol piston (11) for a small stream of oil for influencing the point of actuation of the reliefing piston. Both pistons (5 and 11) are part of seat valves. The pressure relief valve is to be constructed so that the maximum pressure adjusted at high oil viscosity declines. In that way, the hydraulic apparatus containing the pressure relief valve is protected against overloading at low temperatures. For that purpose, the precontrol piston (11) has a bushing-shaped extension (26) that projects into a drilled hole (25) that is connected with an outlet (23). Furthermore, a ring surface (A1) is provided at the precontrol piston (11) that acts in the direction of opening. By means of the extension (26), a pressure-regulating section (27) that is dependent upon viscosity comes into play that generates a dynamic pressure that acts upon the ring surface (A1) when the oil is cold. The dynamic pressure on the precontrol piston (11) that increases when the oil is cold causes a greater drop in pressure in the interior space (17) so that the relief piston 5 clears a larger opening section.

4 Claims, 2 Drawing Sheets

PRESSURE RELIEF VALVE

BACKGROUND OF THE INVENTION

The present invention relates to a precontrolled pressure relief valve with a relief piston acting as a pressure regulator that seals off against a housing. The relief piston has a pressure-regulating aperture leading into its interior chamber from an inlet space. Furthermore, a pilot valve comprising a seat valve is provided, whose inlet is connected with the interior chamber of the relief piston. A spring presses the two pistons in opposite directions in the closed position. A sealing plunger is located in the pilot valve and rests against the housing and serves to reduce an operative surface of the pilot valve. The pilot valve links the interior chamber of the relief piston with a drilled hole that is connected with the outlet.

BRIEF DESCRIPTION OF THE PRIOR ART

A pressure relief valve is already known from DE-OS 28 27 129. That valve is constructed so that the relief piston is as independent of oil viscosity and temperature as is possible. This is accomplished by having the precontrol flow fall off as a result of a special configuration of the pressure-regulating aperture when the viscosity is low, so that the delivery of oil to the pilot valve declines. Consequently, the reduced precontrol flow will prevent an increase of the regulating pressure at the pilot valve. The temperature influence is kept low by a suitable dimensioning of the pressure-regulating aperture through a pin.

To make the construction of hydraulic installations cost-effective, an effort is made to keep the individual structural parts and conduits as small as possible and to burden them to the limit of their endurance. The small dimensions at low temperatures and the high oil viscosity resulting therefrom have the disadvantage of high flow resistances.

If a maximum-pressure safety device is not located right at the pump, the flow resistances are added to the predetermined value of the pressure relief valve. Furthermore, the maximum pressure of the pressure relief valve itself increases as a rule when the viscosity is high. When these increases in pressure are added together, the limits of resistance of individual structural parts will be exceeded and damage will be incurred.

SUMMARY OF THE INVENTION

The object of the present invention is to modify the aforementioned prior pressure relief valve in such a way that the maximum pressure that is set after the pilot valve is opened will decline as the oil viscosity increases (i.e., high flow resistance). This requirement should be satisfied without additional construction costs.

According to the primary feature of the invention, the pressure-regulating aperture in the relief piston is an aperture that is independent of viscosity, and the precontrol piston has a device through which a pressure-regulating section that is dependent upon viscosity comes into being. The pressure-regulating section is dependent upon viscosity by way of a bushing-shaped attachment on the precontrol piston that projects into the drilled hole that is connected with the outlet. The height of the slit or gap of the pressure-regulating section and the length of this pressure-regulating section are of such a size that the flow resistance for the precontrol flow is slight when the oil is at operating temperature. If the oil's viscosity increases, the loss of pressure at the pressure-regulating section increases. The pressure generated at the laminar pressure-regulating section acts upon the precontrol piston on a ring surface and generates a force directed against the common springs. Since the precontrol flow through the aperture is independent of the viscosity, the force acts independently of the viscosity.

In this way, the increase in pressure generated by the flow resistance can be compensated for since the maximum pressure (i.e., pick-up pressure) falls off when the viscosity of the oil increases. Consequently, the static maximum pressure at which the pressure relief valve goes into action can be reduced when the oil is cold—20 bar, for example.

BRIEF DESCRIPTION OF THE FIGURES

A preferred embodiment of the invention is explained in greater detail with the help of the accompanying drawings, in which.

DETAILED DESCRIPTION

Figure 1:
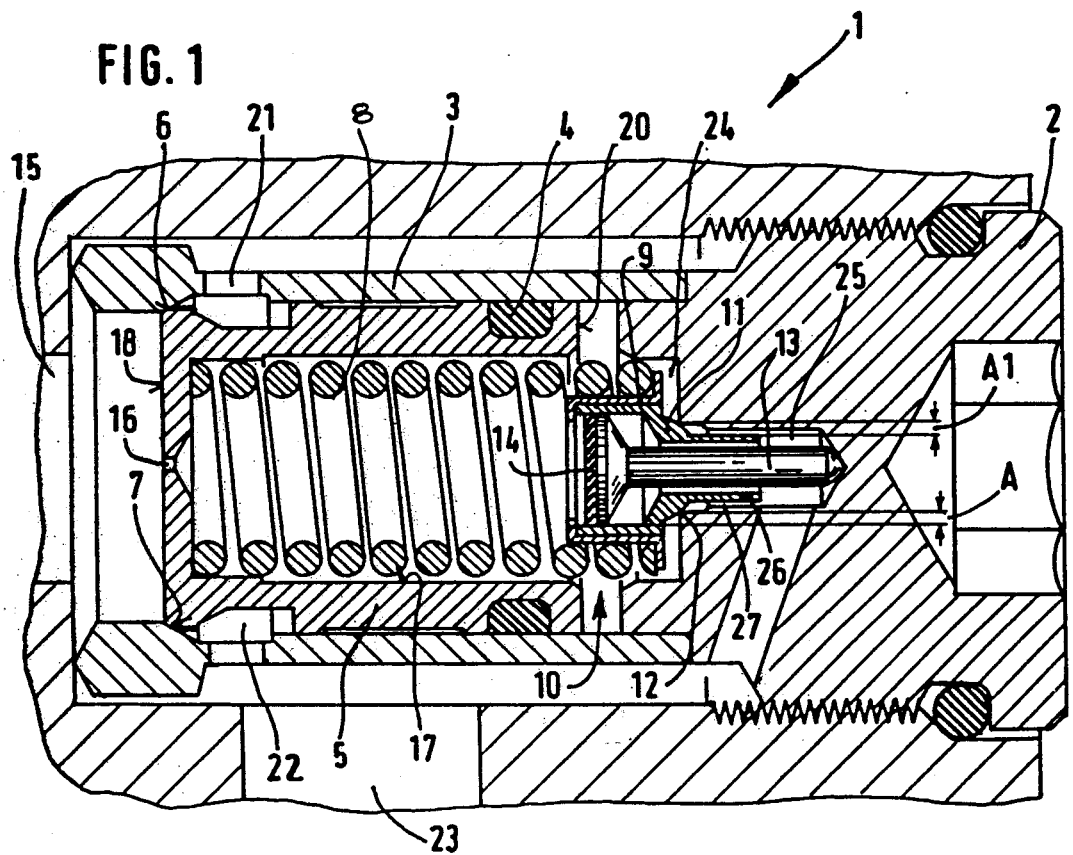
FIG. 1 shows the precontrolled pressure relief valve of the invention in longitudinal section.

The pressure relieve valve 1 is an assembly that can be screwed into place, and it comprises a cartridge 2 and a bushing 3. A relief piston 5, which is sealed off by a circumferential gasket 4, is displaceably carried in the bushing 3. The relief piston 5 includes a ridge 6 at one end to seal off against a valve seat 7 of the bushing 3. A locking spring 8 presses the relief piston 5 against the valve seat 7. A pilot valve 10 has a precontrol piston 11 that is pressed against a valve seat 12 by the locking spring 8. The locking spring 8 rests against a spring holder 9 fastened to the precontrol piston 11. A plunger 13 is supported in the cartridge 2 and serves the purpose of reducing the operative surface of the precontrol piston 11. The precontrol piston 11 is conveyed, oiltight with the help of a gasket 14, on the thickened end of the plunger 13. To open the pilot valve 10, the precontrol piston 11 moves opposite the plunger 13 in the direction of the locking spring 8. A connector 15 is connected with an interior chamber 17 in the relief piston 5 via an aperture 16 independent of viscosity. A front surface 18 of the relief piston 5 facing the connector 15 is smaller in diameter than a front surface 20 on the opposite side of the piston. When no stream of oil is flowing through the aperture 16, the pressure at the connector 15 acts upon the front surfaces 18 and 20. Consequently, a hydraulic force that presses the relief piston 5 against the valve seat 7 acts upon the larger front surface 20. There are drilled holes 21 in the bushing 3 that connect an annular groove 22 in the relief piston 5 with an outlet 23 that is connected with a tank.

The interior chamber 17 is connected with an inlet 24 of the precontrol piston. In the position that is shown in FIG. 1, the precontrol piston 11 separates the inlet 24 from a drilled hole 25 that is connected with the outlet 23. The precontrol piston 11 is subjected to a compressive force acting in the direction of opening that is produced by the pressure in the interior chamber 17 times a ring surface A.

According to the invention, the precontrol piston 11 has a bushing-shaped extension 26 that projects into the drilled hole 25. A laminar pressure-regulating section 27 that generates a dynamic pressure acting upon a ring surface A that increases with the oil viscosity comes into being because of this extension 26. The height of the slit or gap of the pressure-regulating section 27 and the length of the pressure-regulating section are made to be of such a configuration that the flow resistance for the precontrol flow is light at operating temperature. If the oil viscosity increases, the loss of pressure at the pressure-regulating section 27 increases. The pressure generated at the section 27 acts upon the ring surface Al of the precontrol piston 11 and generates a force acting against the locking spring 8 in the direction of opening. That force is only dependent upon the oil viscosity and changes the characteristic curve of the pilot valve 10. The characteristic curves shown in FIG. 2 apply in the operating conditions of the pilot valve as set forth below.

A dotted line L indicates the stream of oil flowing through the aperture 16 that is needed to open the relief piston 5. The characteristic curve K1 shows the pattern at high oil viscosity. The opening point for the precontrol piston 11 is designated I. As soon as a stream is flowing, a pressure difference forms at the ring surface Al that, aside from the compressive force on the ring surface A, acts as an additional force on the direction of opening the pilot valve 10. For that reason, the characteristic curve of the pilot valve 20 falls off independently of the viscosity. The characteristic curve K2 shows a pattern in which the oil has not yet reached its operating temperature. Consequently, the oil viscosity is still relatively high. Finally, the characteristic curve K3 shows a pressure pattern of the pilot valve 20 at normal operating temperature.

The operation of the entire pressure relief valve will now be described.

To open the precontrol piston 11, the pressure at the connector 15 rises to the value of the opening point I. That pressure prevails through the aperture 16 in the interior chamber 17. The precontrol piston 11 opens when the power of the pressure on the surface A is bigger than the power of the locking spring 8.

Figure 2:
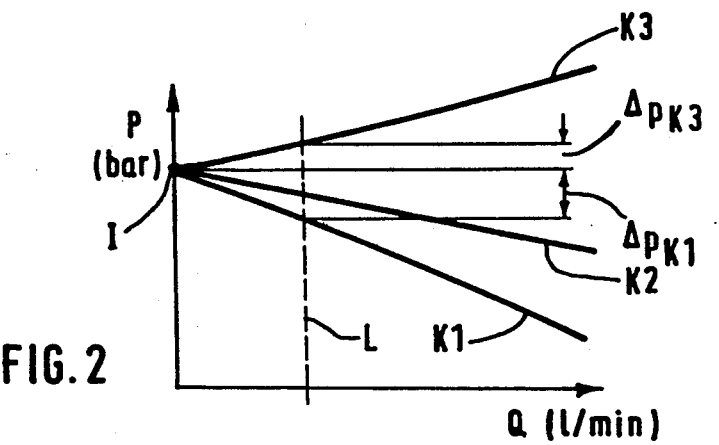
FIG. 2 shows several pressure characteristic curves of the pilot valve.
Figure 3:
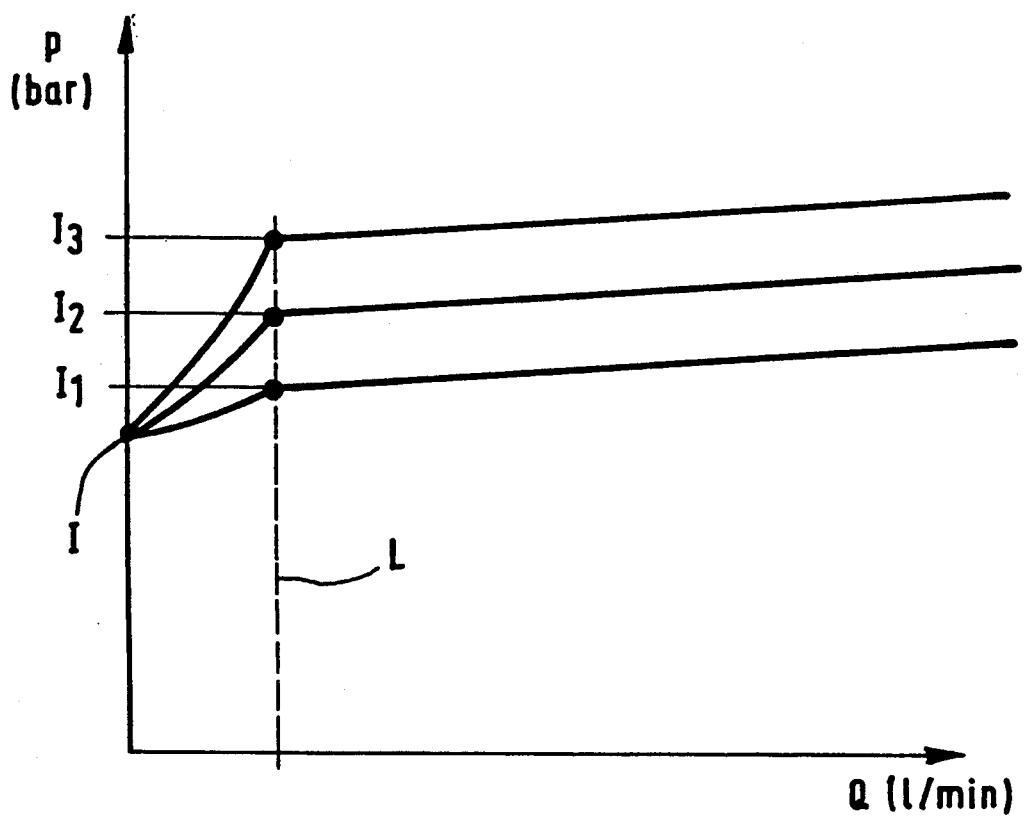
FIG. 3 shows characteristic curves for the entire valve leading away from the pilot valve.

The characteristic curves of FIG. 3 belonging to the pressure relief valve show the pressure P on the stream Q at the connector 15. Because of the unequal front surfaces 18 and 20, the relief piston 5 does not open, at first. For it to open, a differential pressure $\Delta P = F20/F18 \cdot P_{17} - f18/F20 \cdot P_{15}$ must be built up through the aperture 16. (The corresponding reference numerals of FIG. 1 appear as index numbers behind the letters.) The pressure at the connector 15 therefore increases, according to FIG. 3, by that differential pressure $\Delta P + \Delta P_{K3}$ from FIG. 2 to Point $I_3$. Then the relief piston 5 opens. That holds true at normal operating temperature. At high oil temperature, a pressure lower than the opening pressure I by $\Delta P_{K1}$ is adjusted to open the precontrol piston 11 at the pilot valve 10. Consequently, the pressure point $I_1$ plus the $\Delta P = F20/f18 \cdot P_{17} - f18/F20 \cdot P_{15}$ less the $P_{K1}$ (FIG. 2).

The characteristic curve of the pressure relief valve coming from Point I in FIG. 3 is to be joined with the characteristic curve K2 of the pilot valve 10 according to FIG. 2 in the appropriate manner.

What is claimed is:

1. In a precontrolled pressure relief valve including a relief piston (5) acting as a pressure regulator that is sealed off against a valve seat (7), the relief piston (5) having a pressure-regulating aperture (16) leading from a connector (15) into its interior chamber (17), a pilot valve (10) comprising a precontrol piston (11) and a seat valve and loaded with a spring, the pilot valve having an inlet (24) that is connected with the interior chamber (17) of the relief piston (5), a locking spring (8) for pressing the relief piston (5) against the valve seat (7), and a plunger (13) located in sealing relation in the precontrol piston and resting against a housing for reducing a surface of the precontrol piston that acts in the closing direction, the precontrol piston (11) connecting the interior chamber (17) with a drilled hole (25) connected with an outlet and the relief piston (5) having a front surfaces (18 and 20) of different sizes, the improvement which comprises
the pressure-regulating aperture in the relief piston (5) comprises an aperture (16) constructed so that the pressure drop thereacross is independent of the viscosity of the fluid being controlled, and the precontrol piston (11) includes pressure regulating means (27) constructed so that the pressure drop thereacross is dependent upon the viscosity of the fluid being controlled, said pressure regulating means comprising a bushing shaped extension (26) of said precontrol piston arranged coaxial with and spaced from the plunger (13).

2. A precontrolled pressure relief valve as defined in claim 6, wherein said pressure regulating means is constructed in a manner that the flow therethrough is laminar.

3. A precontrolled pressure relief valve as defined in claim 2, wherein said busing-shaped extension projects into the drilled hole connected with the outlet.

4. A precontrolled pressure relief valve as defined in claim 3, wherein said pressure regulating means defines a gap configured to maintain the flow resistance for the precontrol flow slight when the oil within the valve is at operating temperature.

* * * * *